US010565551B2

(12) United States Patent
Shi et al.

(10) Patent No.: US 10,565,551 B2
(45) Date of Patent: Feb. 18, 2020

(54) SYSTEM AND METHOD OF DETERMINING ITEM STORAGE STRATEGY

(71) Applicants: Beijing Jingdong Shangke Information Technology Co., Ltd., Beijing (CN); JD.com American Technologies Corporation, Mountain View, CA (US)

(72) Inventors: Yuhui Shi, Mountain View, CA (US); Yixiong Chen, Mountain View, CA (US); Chaofeng Li, Mountain View, CA (US); Di Wu, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 160 days.

(21) Appl. No.: 15/975,731

(22) Filed: May 9, 2018

(65) Prior Publication Data
US 2019/0347607 A1 Nov. 14, 2019

(51) Int. Cl.
G06Q 10/08 (2012.01)
G06N 7/00 (2006.01)
G06N 3/08 (2006.01)
G06N 3/04 (2006.01)

(52) U.S. Cl.
CPC ......... *G06Q 10/087* (2013.01); *G06N 3/0454* (2013.01); *G06N 3/08* (2013.01); *G06N 7/005* (2013.01)

(58) Field of Classification Search
None
See application file for complete search history.

(56) References Cited

U.S. PATENT DOCUMENTS

2015/0088307 A1* 3/2015 Ackerman ........... G06Q 10/087 700/241

* cited by examiner

Primary Examiner — Paul Danneman
(74) Attorney, Agent, or Firm — China Science Patent & Trademark US LLC

(57) ABSTRACT

A system for selecting items to be stored in a warehouse from a list of candidate items. The system includes a computing device having a processor and a storage device storing computer executable code. The executed code is configured to: assign scores to the respective candidate items based on an item selection model; and select items from the candidate items to be stored in the warehouse according to the assigned scores under a capacity limit of the warehouse. The item selection model is configured with an Artificial Neural Network (ANN), having item data for an item as input and a score for that item as output. The score represents a probability that the item is to be stored in the warehouse. The ANN is trained by historical orders with an objective of maximizing a probability that the orders have their respective item(s) all stored in the same warehouse.

20 Claims, 9 Drawing Sheets

| | |
|---|---|
| Order Data: | MacbookPro, keyboard, mouse |
| History Sales: | 15, 20, 30 |
| Promotion Data: | 0, 1, 0 |
| SKU Embedding Layer: | [ (0.25, 0.3, -0.2), (0.35, 0.1, 0.2), (0.21, -0.2, 0.25)] |
| Category Embedding Layer: | [ (-2.0, 0.13, -0.2), (0.52, -0.15, 0.32), (0.52, -0.15, 0.32)] |
| Item Score: | [2, 3, 2] |
| Order Feature Representation: | [ (0.25, 0.3, -0.2, -2.0, 0.13, -0.2, 15, 0), (0.35, 0.1, 0.2, 0.52, -0.15, 0.32, 20, 1), (0.21, -0.2, 0.25, 0.52, -0.15, 0.32, 30, 0)] |
| First Hidden Layer: | [ (2, -0.2, 4, -0.2, 3), (0.1, -0.3, 2.3, 3.3), (0.21, 0.2, 0.5, -3)] |
| Second Hidden Layer: | [ (-2, 2.4, -4.2, -2), (5.1, -1.3, 3.3, -3.3), (0.61, 2.2, 8.5, -3.1)] |
| Item Score: | [10, 8, 6] |
| Item in-Assortment Probability: | [0.9, 0.8, 0.25] |
| Order Satisfaction Probability: | 0.9 X 0.8 X 0.1 = 0.144 |

US 10,565,551 B2

SYSTEM AND METHOD OF DETERMINING ITEM STORAGE STRATEGY

FIELD

The present disclosure relates generally to warehousing and logistics, and more particularly to systems and methods of determining item storage strategy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-Commerce companies use regional distribution centers (RDC) to fulfill orders placed by customers form different geographical areas in a timely manner. However, due to the capacity limit of warehouses, it is impossible to store all items sold on the company's website in one RDC. An order containing an item that is not stored in the RDC serving the area will come in several packages, since the missing item needs to be shipped from another RDC which has it. In this case, the order is called being split. The order split leads to longer fulfillment time, higher cost regarding additional packing materials and shipping cost.

It is therefore important to carefully select items to be stored in an RDC. Conventionally, items with high sales volume are considered as high ranking candidates to be stored. However, those sales-based methods have some disadvantages. For example, they ignore relationship between different items since the items are being considered in an independent manner. Further, they do not use understandings of an item in the decision making process since only sales data are involved.

Therefore, an unaddressed need exists in the art to address the aforementioned deficiencies and inadequacies.

SUMMARY

In one aspect, the disclosure is directed to a system for selecting items to be stored in a warehouse from a list of candidate items. In certain embodiments, the system includes a computing device, which includes a processor and a storage device storing computer executable code. The computer executable code, when executed at the processor, is configured to:

assign scores to the respective candidate items based on an item selection model; and select items from the candidate items to be stored in the warehouse according to the assigned scores under a capacity limit of the warehouse, wherein the item selection model is configured with an Artificial Neural Network (ANN), having item data for an item as input and a score for that item as output, the score representing a probability that the item is to be stored in the warehouse, and wherein the ANN is trained by historical orders, each of which includes one or more items, under a constraint of the capacity limit of the warehouse with an objective of maximizing a probability that the orders have their respective item(s) all stored in the same warehouse.

In another aspect, the present disclosure relates to a method of selecting items to be stored in a warehouse from a list of candidate items. The method includes: establishing an item selection model with an Artificial Neural Network (ANN), having item data for an item as input and a score for that item as output, the score representing a probability that the item is to be stored in the warehouse;

training the item selection model with historical orders, each of which includes one or more items, under a constraint of a capacity limit of the warehouse with an objective of maximizing a probability that the orders have their respective item(s) all stored in the same warehouse;

assigning scores to the respective candidate items based on the trained item selection model; and selecting items from the candidate items to be stored in the warehouse according to the assigned scores under the capacity limit of the warehouse.

In another aspect, the present disclosure relates to non-transitory computer readable medium storing computer executable code. The computer executable code, when executed at a processor, is configured to:

establish an item selection model with an Artificial Neural Network (ANN), having item data for an item as input and a score for that item as output, the score representing a probability that the item is to be stored in the warehouse;

train the item selection model with historical orders, each of which includes one or more items, under a constraint of a capacity limit of the warehouse with an objective of maximizing a probability that the orders have their respective item(s) all stored in the same warehouse;

assign scores to the respective candidate items based on the trained item selection model; and select items from the candidate items to be stored in the warehouse according to the assigned scores under the capacity limit of the warehouse.

In certain embodiments, the ANN is configured with two or more hidden layers.

In certain embodiments, the item data for the item is represented as a vector corresponding to the item. In certain embodiments, the vector for the item comprises element(s) associated with a unique identification (ID) of the item and element(s) associated with a property of the item. For example, the property comprises at least one of category or brand of the item. In certain embodiments, the vector for the item further comprises an element associated with sales data of the item and/or an element associated with promotion data of the item.

In certain embodiments, mapping from the ID to its corresponding elements and mapping from the property to its corresponding elements are updated based on the training.

In certain embodiments, the element(s) associated with the ID or the element(s) associated with the property is/are randomized at initialization of the ANN.

In certain embodiments, a probability that an item is to be stored in the warehouse is a sigmoid function of the score assigned to that item, that is, the probability $p_{item}$ and the score $\theta_{item}$ satisfy:

$$p_{item} = \text{sigmoid}(\theta_{item}) = \frac{1}{1 + e^{-\theta_{item}}}.$$

In certain embodiments, a probability that an order has its items all stored in the same warehouse is a production of probabilities that the respective items included in this order are to be stored in the warehouse, and the ANN is configured to maximize a sum of the probabilities of the respective orders.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
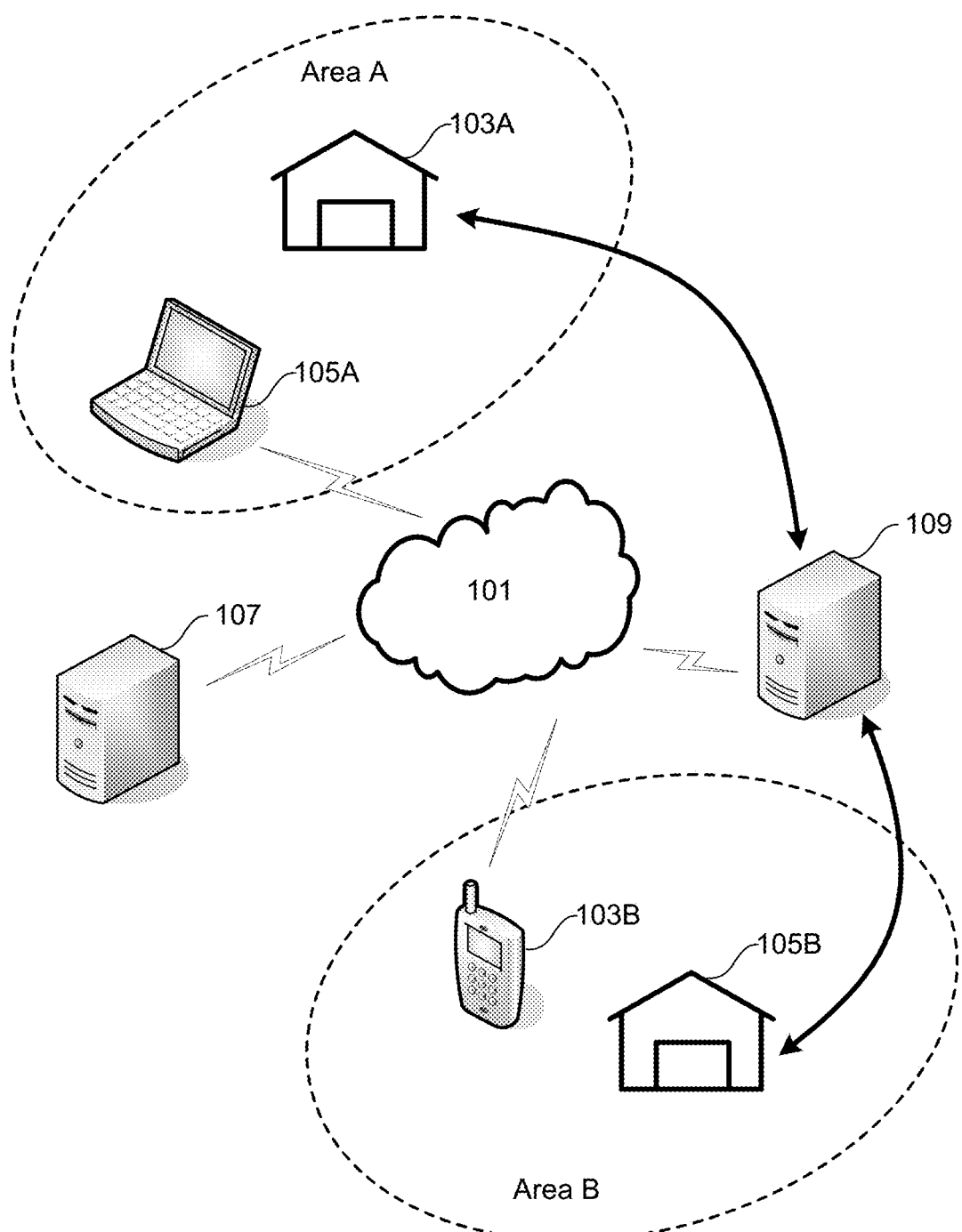
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is directed to an Artificial Neural Network (ANN) based system. The ANN is configured to map item data for an item to a score for that item, the score representing a probability that the item is to be stored in a warehouse. The ANN is trained with historical orders, each of which includes one or more items. The ANN is trained under a constraint of a capacity limit of the warehouse with an objective of maximizing a probability that the orders have their respective item(s) all stored in the same warehouse. The trained ANN is then used to assign scores to respective candidate items. Then, the system can select items from the candidate items to be stored in the warehouse according to the assigned scores under the capacity limit of the warehouse. In this system, the scores are assigned by considering not only the individual items, but also the orders which imply relationship between the items (for example, some items are often purchased together). As a result, it is possible for the items stored in the warehouse to cover most of customer order needs, and to reduce cases where items not belonging to the warehouse are purchased together with items within the warehouse, thus reducing the chance of an order being split into several ones.

FIG. 1 schematically depicts a system according to certain embodiments of the present disclosure. As shown in FIG. 1, the system 100 is deployed to serve some geographical areas, two of which, Area A and Area B, are illustrated. Area A or Area B may be a state, a city, or the like. To fulfill orders from those areas in a timely manner, warehouses serving those areas are built in the respective areas, for example, a warehouse 103A in Area A and a warehouse 103B in Area B. Though it is illustrated that one warehouse serves one area, it is possible that two or more warehouses serve one area and/or that one warehouse serves two or more areas. Such a warehouse or warehouses serving an area is/are called a regional distribution center (RDC).

The system 100 includes a network 101, a terminal device 105A of a user located in, for example, Area A, a terminal device 105B of a user located in, for example, Area B, and servers 107, 109 which are interconnected via the network 101.

The network 101 is a media to provide communication links between, e.g., the terminal devices 105A, 105B and the servers 107, 109. In some embodiments, the network 101 may include wired or wireless communication links, fiber, cable, or the like. In some embodiments, the network 101 may include at least one of Internet, Local Area Network (LAN), Wide Area Network (WAN), or cellular telecommunications network. The network 100 may be homogenous or heterogeneous. Area A and Area B may have same or different networks deployed therein and connected to the network 101 via gateways, switches, routers or the like.

The terminal devices 105A, 105B may be used by their respective users to interact with each other, and/or with the servers 107, 109, to, for example, receive/send information therefrom/thereto. In certain embodiments, at least some of the terminal devices 105A, 105B may have various applications (APPs), such as, on-line shopping APP, web browser APP, search engine APP, Instant Messenger (IM) App, e-mail APP, and social networking APP, installed thereon. In some embodiments, the terminal devices 105A, 105B may include electronic devices having an Input/Output (I/O) device. The I/O device may include an input device such as keyboard or keypad, an output device such as a display or a speaker, and/or an integrated input and output device such as a touch screen. Such terminal devices may include, but not limited to, smart phone, tablet computer, laptop computer, or desktop computer.

The servers 107, 109 are servers to provide various services. In certain embodiments, the servers 107, 109 may include a backend server supporting E-commerce, e.g., on-line shopping by the terminal devices 105A, 105B. In certain embodiments, the servers 107, 109 may be implemented by the distributed technique, the cloud technique, or the like. Therefore, at least one of the servers 107, 109 is not limited to the illustrated single one integrated entity, but may include interconnected entities (for example, computing platforms, storage devices, or the like) which cooperate with each other to perform some functions, for example, those functions to be described hereinafter.

In certain embodiments, the system 100 may include an E-commerce system. Various users may use their respective terminal devices 105A, 105B to browse items and/or search for specific items. Also, the system may recommend some items to the users. If the user finds one or more desired items, then he or she may make an order for those items.

For convenience of explanation, it is assumed here that the server 107 supports order related services, such as item presenting and order making, and that the server 109 supports inventory control and order fulfillment related services, such as storage management and management of packaging and delivery. However, it is to be understood that the disclosed technology is not limited thereto. In certain embodiments, the servers 107 and 109 may merge. In certain embodiments, there may be multiple servers, at least some of which cooperate to provide the order related services, at least some of which cooperate to provide the inventory control and order fulfillment related services, or at least some of which provide both (at least a part of) the order related services and (at least a part of) the inventory control and order fulfillment related services.

The warehouses 103A and 103B have their respective inventories. Generally, an order containing items to be delivered to a user in an area should be fulfilled by a warehouse or RDC serving that area, for quick fulfillment. For example, when a user A of the terminal device 105A, makes an order for some specific items (indicated as item 1 and item 2) with his terminal 105A, the order related server 107 receives this order and then passes this order to the inventory control and order fulfillment related server 109. The inventory control and order fulfillment related server 109 then instructs the warehouse 103A serving Area A in which the user A is located to pick up the ordered item 1 and item 2 from the warehouse 103A, packaging the picked items into one or more packages, and then deliver the package(s) to the user A. If, however, the order contains an item, for example, item 2, that is not stored in the warehouse 103A, then this order cannot be fulfilled by the warehouse 103A only. In this case, the inventory control and order fulfillment related server 109 can instruct the warehouse 103A to pick up and package item 1 and deliver this package to the user A, and instruct another warehouse having item 2 stored therein, for example, the warehouse 103B, to pick up and package item 2 and deliver this package to the user A separately from the package containing item 1. The fulfillment quality is degraded because of, longer fulfillment time, separate deliveries for one same order, or the like. Further, addition costs are caused.

The inventory control and order fulfillment related server 109 is configured to manage the inventories of the respective warehouses 103A and 103B for improved fulfillment. In certain embodiments, the inventory control and order fulfillment related server 109 is configured to choose items to be stored in the warehouse or RDC at least partially based on historical orders, rather than only relying on (for example, sales of) individual items. More specifically, the inventory control and order fulfillment related server 109 takes relationship between items into account. Here, two items can be considered as being related to each other if they have even been ordered in one or more same orders.

Figure 2:
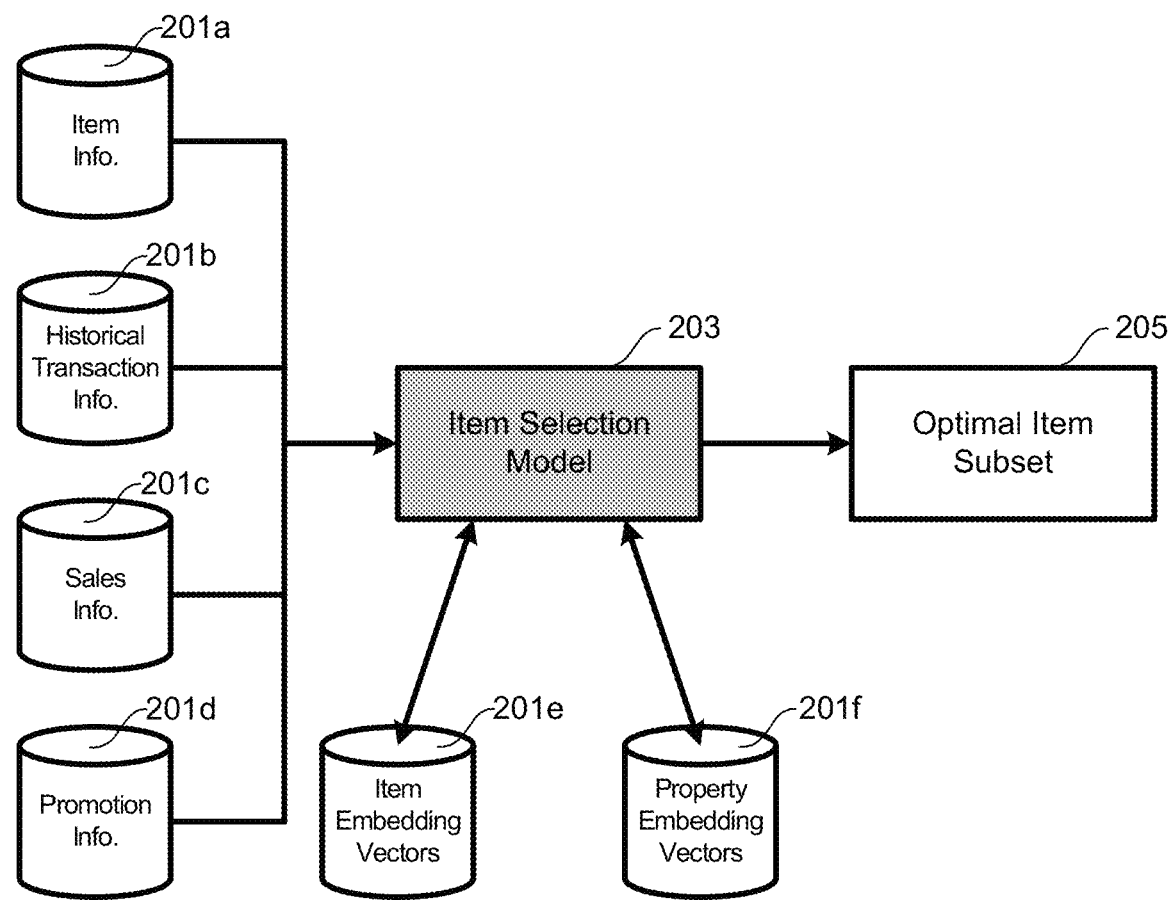
FIG. 2 schematically depicts a method of selecting items from a list of candidate items to be stored in a warehouse according to certain embodiments of the present disclosure.

In certain embodiments, the inventory control and order fulfillment related server 109 is configured to select, from a list of candidate items ("C"), items to be stored in the warehouse or RDC (those selected items constitute a subset s of C, which is called an optimal item subset hereinafter) for a future period (for example, the next two weeks or the next month) by running a computer executable code, stored therein or somewhere else, e.g., cloud. FIG. 2 schematically shows a flow executable by the inventory control and order fulfillment related server 109. The inventory control and order fulfillment related server 109 can perform the follow periodically to update the optimal item subset s. In FIG. 2, the shaded block indicates a learnable component.

The inventory control and order fulfillment related server 109 is configured to decide the storage strategy based on an item selection model. The item selection model 203 is configured to map item data for an item to a score for that item, which score represents a probability that the item is to be stored in the warehouse or RDC. The item selection model 203 is configured as a learnable component, so that it can learn from historical data to optimize the mapping from the item data to the score. In certain embodiments, the item selection model 203 is configured with an Artificial Neural Network (ANN), which will be described in more detail hereinafter. For such a learnable component, it should be trained before it is used to predict the storage strategy for a future period.

The training and the predicting involve a lot of data. Those data can be organized in various databases, for example, an item information database 201a, a historical transaction information database 201b, a sales information database 201c, and a promotion information database 201d. Those databases can be implemented in an integrated form or a distributed form.

The item information database 201a is configured to maintain information relevant to respective items for sale. For example, the information relevant to each of the items comprises a unique identifier (ID) of the item, and properties such as category or brand of the item. In certain embodiments, there are categories at different levels, for example, a lower level category of "beer" and a higher level category of "drink." The item information database 201a may be maintained by the inventory control and order fulfillment related server 109. For example, when some new items are stocked, the inventory control and order fulfillment related server 109 can add information on those new items to the item information database 201a.

The historical transaction information 201b is configured to maintain information relevant to historical transactions, for example, historical orders which have been fulfilled, or the like. Each of the orders can include one or more items. The historical transaction information 201b may be maintained by the inventory control and order fulfillment related server 109. For example, when the inventory control and order fulfillment related server 109 has fulfilled an order, the inventory control and order fulfillment related server 109 can add details of this order to the historical transaction information 201b. The details may include, for example, ID's of items included in this order, number of each of the items, order date, fulfillment date, delivery address, promotion information, or the like. The historical transaction information 201b may maintain the historical transaction information for a predetermined interval, such as, last two weeks, last one month, or the like.

The sales information database 201c is configured to maintain sales information for the respective items, for example, historical sales information for said predetermined interval or predicted sales information for said future period. The historical sales information may be derived from the historical transaction information. Further, the sales information database 201c may be maintained by a sales prediction server. For example, the sales prediction server can predict the sales information for the future period based on the historical sales information. There are various methods to predict the sales information.

The promotion information database 201c is configured to maintain promotion information. For example, the promotion information indicates items(s) with promotion in said predetermined interval and/or item(s) with promotion in said future period.

Based on the data collected from the various databases, especially the historical orders, the inventory control and order fulfillment related server 109 is configured to train the item selection model at 203. Pieces of item data for the respective items included in the historical orders can be inputted to the item selection model, resulting in the respective scores. A piece of item data for each item may comprise an ID of the item and a property of the item, and optionally, also sales information and/or promotion information of the item. Such scores can be converted into probabilities that the respective items are to be stored in the warehouse. For example, the higher is the score, the greater is the probability. In certain embodiments, the probability is determined as a sigmoid function of the score. That is, the probability $p_{item}$ and the score $\theta_{item}$ satisfy:

$$p_{item} = \text{sigmoid}(\theta_{item}) = \frac{1}{1+e^{-\theta_{item}}}.$$

In certain embodiments, the item selection model 203 is trained under a constraint of the capacity limit of the warehouse with an objective of maximizing a probability that the orders have their respective item(s) all stored in the same warehouse. In certain embodiments, a probability that an order has its items all stored in the same warehouse can be calculated as a production of probabilities that the respective items included in this order are stored in the warehouse, and the objective can be equivalent to maximizing a sum of the probabilities for the respective orders (this sum can be called as the "fulfillment effect" of the historical orders by the same warehouse). This is a process of machine learning.

To facilitate the operation of the item selection model 203, the inventory control and order fulfillment related server 109 is configured to represent the collected data as vectors. For each item, its relevant item data can be represented as a vector. For example, the vector for each item comprises element(s) associated with the ID of the item and element(s) associated with the property of the item. Mapping from the ID of the item of its corresponding element(s) can be maintained in an item embedding vector database 201e, and mapping from the property of the item to its corresponding element(s) can be maintained in a property embedding vector database 201f. The item embedding vector database 201e and the property embedding vector database 201f can be updated during the machine learning process.

Optionally, the vector for each item further comprises an element associated with sales data of the item of the item and/or an element associated with promotion data of the item.

When the item selection model 203 has been trained, for example, by optimizing parameters adopted therein and also the mapping from item's ID to corresponding element(s) and the mapping from item's property to corresponding element(s), it can be used to predict the storage strategy in said future period. In certain embodiments, item data for the respective candidate items can be inputted to the item selection model 203, to calculate scores for the respective candidate items. Each of the scores represents a probability that a corresponding candidate item is to be stored in the warehouse in said future period. Likewise, the probability can be a sigmoid function of the score.

Based on the scores outputted from the item selection model 203, the inventory control and order fulfillment related server 109 is configured to select items (for example, with higher scores) from the candidate list to be stored in the warehouse under the capacity limit of the warehouse at 205, resulting in the optimal item subset s. For example, if the capacity of the warehouse allows M items, the order fulfillment related server 109 can rank the candidate items by their scores and select the top M items to be stored in the warehouse.

The inventory control and order fulfillment related server 109 is configured to compare the optimal item subset s with the current inventory of the warehouse. Items which belong to the optimal item subset s but are not in the warehouse will be added to the warehouse, while replenishment of items which are in the warehouse but do not belong to the optimal item subset s will be stopped from further replenishment.

Figure 3:
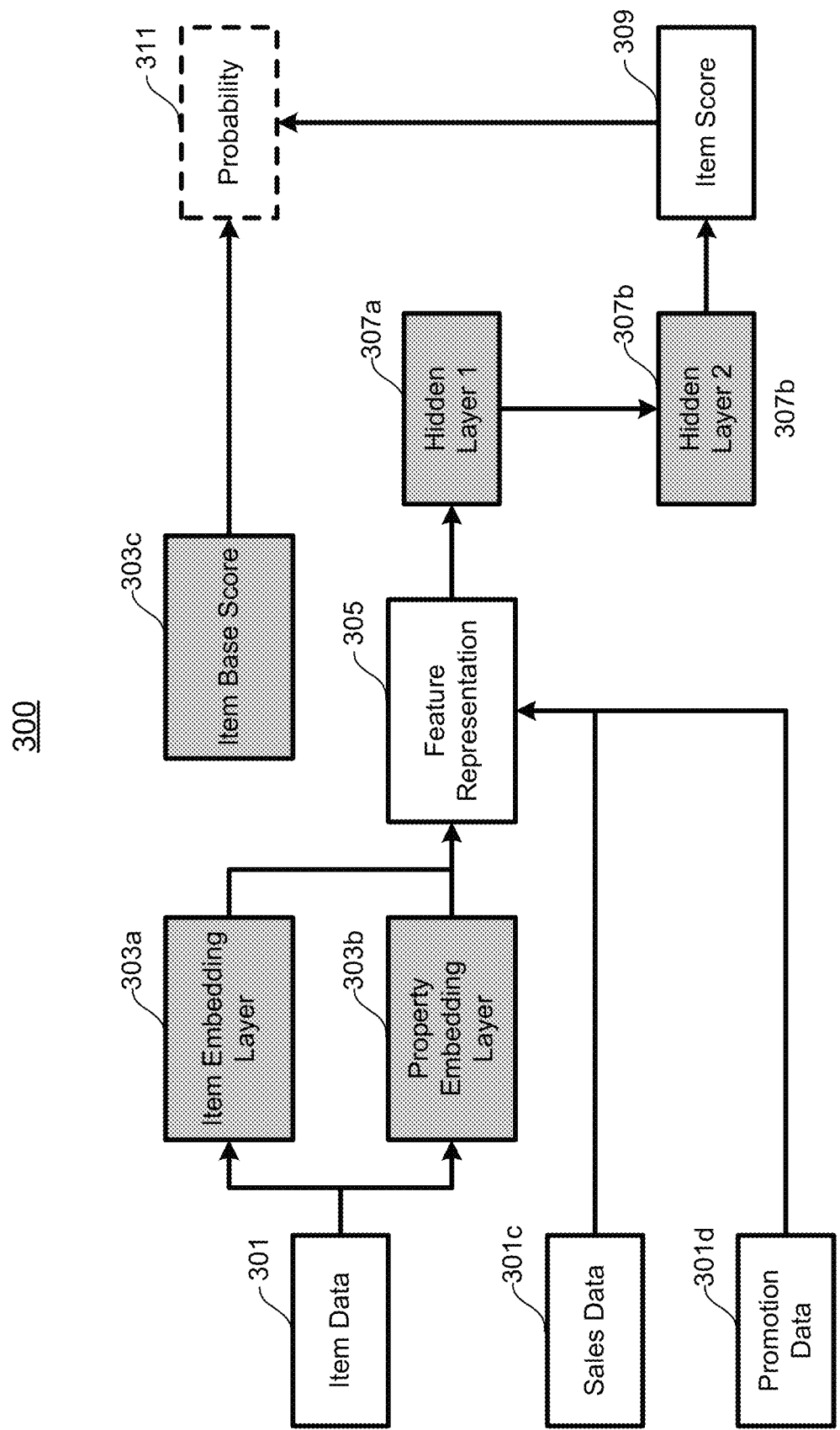
FIG. 3 schematically depicts an item selection model according to certain embodiments of the present disclosure.

FIG. 3 schematically depicts an item selection model according to certain embodiments of the present disclosure. In FIG. 3, each of the shaded blocks indicates a learnable component.

As shown in FIG. 3, the item selection model 300 comprises an item embedding layer 303a, a property embedding layer 303b, an item base score block 303c, and a feature representation block 305, and several (two in this example) hidden layers 307a, 307b.

Hereinafter, the training process is explained firstly.

During the training process, historical orders in a past period, which period can be equivalent in duration to said future period, are considered. For example, those historical orders are retrieved from the historical transaction information database 201b. More specifically, items included in those orders are considered. As described above, item data 301 for those items can be collected from, for example, the item information database 201a. Assume there is a historical order X including n items, that is, X={item 1, item 2, ..., item n}.

The item embedding layer 303a is configured to map each of the items, more specifically, an ID of the item, to a vector by referring to an item embedding vector database (for example, 201e in FIG. 2). Here, assume the vector for the ID of each item is a k-dimension vector. Then, item 1 can be mapped to a vector of $(x_{11}, x_{12}, \ldots, x_{1k})$, item 2 can be mapped to a vector of $(x_{21}, x_{22}, \ldots, x_{2k})$, and item n can be mapped to a vector of $(x_{n1}, x_{n2}, \ldots, x_{nk})$.

The property embedding layer 303b is configured to map each of the items, more specifically, a property of the item, to a vector by referring to a property embedding vector database (for example, 201f in FIG. 2). Here, assume the vector for the property of each item is an l-dimension vector. Then, the property of item 1 can be mapped to a vector of $(y_{11}, y_{12}, \ldots, y_{1l})$, the property of item 2 can be mapped to a vector of $(y_{21}, y_{22}, \ldots, y_{2l})$, and the property of item n can be mapped to a vector of $(y_{n1}, y_{n2}, \ldots, y_{nl})$.

The feature representation block 305 is configured to represent the item data by assembling the vectors. For example, the above order X can be expressed as:

$$\begin{bmatrix} (x_{11}, x_{12}, \ldots, x_{1k}, y_{11}, y_{12}, \ldots, y_{1l}, s_1, p_1) \\ (x_{21}, x_{22}, \ldots, x_{2k}, y_{21}, y_{22}, \ldots, y_{2l}, s_2, p_2) \\ \ldots \\ (x_{n1}, x_{n2}, \ldots, x_{nk}, y_{n1}, y_{n2}, \ldots, y_{nl}, s_n, p_n) \end{bmatrix}.$$

Here, $s_j$ and $p_j$ represent sales information of item j from a sales database 301c (for example, the sales information databases 201c in FIG. 2) and promotion information (for example, "1" indicating promotion, and "0" indicating no promotion) of item j from a promotion database 301d (for example, the promotion information databases 201d in FIG. 2), respectively. Here, the sales information for an item can comprise predicted and/or historical sales information for that item with respect to said past period. For example, the predicted sales information was ever predicted for said past period before the start time of said past period, and the historical sales information is that before said past period in said predetermined interval. Likewise, the promotion information for an item can comprise predicted and/or historical promotion information for that item with respect to said past period.

In this example, all pieces of item data for the respective items included in the order X are put together in a matrix form. This facilitates the operation of the model. Therefore, the feature representation block 305 can be called an item feature representation block for representing an item as a vector, or otherwise an order feature representation block for representing an order as a matrix. The "item representation" and "order representation" are exchangeable in this context.

However, the present disclosure is not limited thereto. It suffices that each item is represented as a vector, regardless of whether all items in an order are put together or not. In this example, each item is represented as a (k+l+2)-dimension vector, with k elements corresponding to the item's ID, l elements corresponding to the item's property, 1 (one) element corresponding to the item's sales, and 1 (one) element corresponding to the item's promotion information. For example, an order may have pieces of item data for respective items included in this order inputted into the model sequentially, optionally with an indicator indicating that those items belong to one same order.

The vectors or the matrix is then subject to the hidden layers 307a, 307b, to be converted to corresponding scores 309. That is, the hidden layers 307a, 307b are configured to reduce a (k+l+2)—dimension vector to a 1 (one)—dimension scalar, or if each order has its item(s) processed together as a matrix, transform a (k+l+2)×n matrix to an n-dimension vector. Here, two or more hidden layers 307a, 307b can be used to allow for nonlinearity.

In converting a calculated score 309 for an item to a probability 311 that this item is to be stored in the warehouse or RDC, an item base score 303c for this item can be taken into account. The item base score 303c can be considered as an offset to the calculated score 309. The base scores for the respective items can be set, for example, to be equivalent to each other at initialization, and then updated during the machine leaning process.

Figure 4:
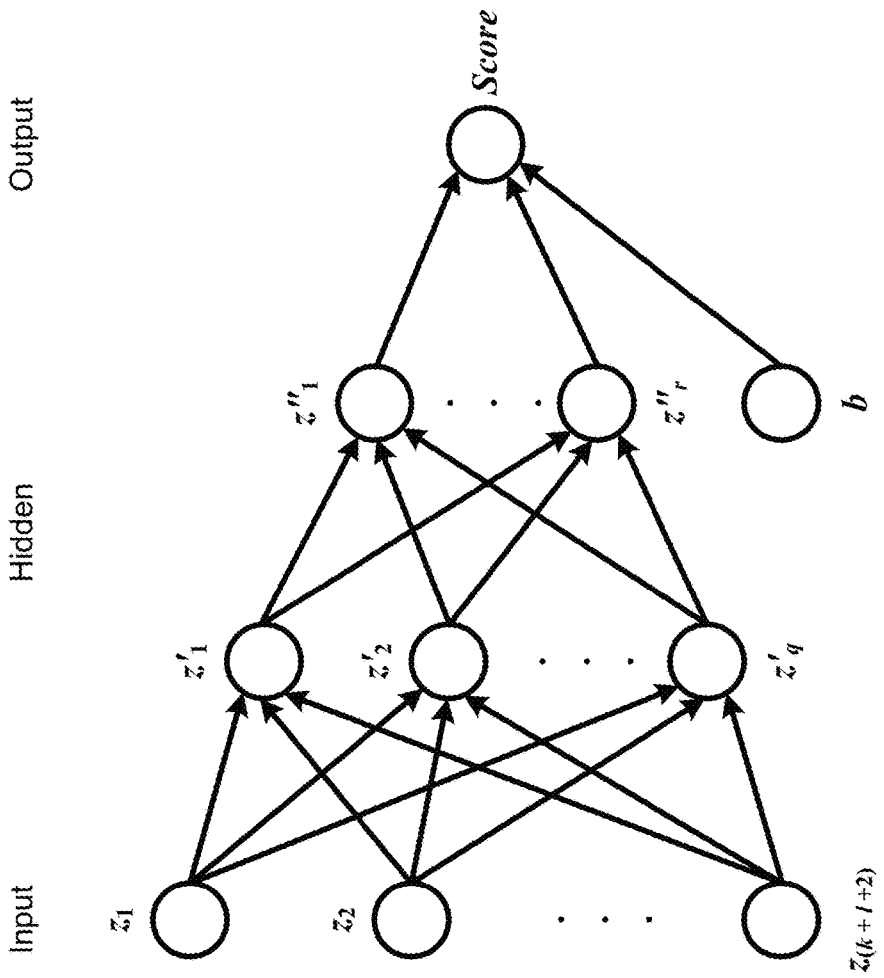
FIG. 4 schematically depicts an Artificial Neural Network (ANN) according to certain embodiments of the present disclosure.

FIG. 4 schematically depicts an Artificial Neural Network (ANN) according to certain embodiments of the present disclosure.

As shown in FIG. 4, the ANN 400 comprises an input layer, hidden layers, and an output layer. In Ann 400, each circle indicates a node or neuron, and an arrow between the nodes or neurons indicates a weight. A node or neuron can be a function (or, activation function) of a weighted sum of previous-layer node(s) or neuron(s) connected thereto by corresponding arrows.

In this example, the input is the representation of the item data, i.e., the (k+l+2)-dimension vector. Accordingly, the input layers has (k+l+2) nodes, $z_1, z_2, \ldots, z_{(k+l+2)}$. Further, the output is the score for the item. Accordingly, the output layer has only 1 (one) node, Score. The hidden layers may have q and r nodes, respectively. In the dimension reduction case, generally, it holes that (k+l+2)>q>r>1.

At initialization, all parameters (for example, the weights) in the ANN 400 can be randomized or assigned in any appropriate manner.

By the ANN 400, each piece of item data for a corresponding item is converted to a corresponding score. In the above example, the historical order X is converted by the ANN 400 to a score vector (Score 1, Score 2, ..., Score n), where Score 1 indicates a score for item 1, Score 2 indicates a score for item 2, and so on. Here, the item base score can be considered as a bias to the Score. Those scores can be converted to probabilities that the corresponding items are to be stored in the warehouse based on, for example, the sigmoid function. As a result, a probability vector ($p_1, p_2, \ldots, p_n$) for the historical order X can be derived, where $p_1$ indicates a probability that item 1 is to be stored in the warehouse, $p_2$ indicates a probability that item 2 is to be stored in the warehouse, and so on. Therefore, a fulfillment probability of the historical order X by the same warehouse can be calculated as $p_x=p_1 \times p_2 \times \ldots p_n$, and the fulfillment effect of all the historical orders in said past period by the same warehouse can be evaluated based on a sum of the fulfillment probabilities of the respective historical orders. Then, the parameters in the ANN 400, including the various weights and the bias, can be optimized by maximizing the fulfillment effect. For example, if increase in a particular parameter causes increase in the fulfillment effect, then this particular parameter can be adjusted to be greater; or vice versa.

In certain embodiments, the representation for a particular item ID and the representation for a particular item property are also adjusted during the training. The representations of ID's the respective items and the representations of the property of the respective items as a result of the training can be saved in the item embedding vector database 201e and the property embedding vector database 201f, respectively. The item embedding layer 303a and the property embedding layer 303b can use the adjusted or updated representations to embed the vectors for the items.

After the training process, the model will have a set of definite parameters determined by the training process. The prediction can be performed based on the determined parameters.

For example, for a candidate item inputted to the item selection model, the item can be represented as a vector, which is inputted to the ANN to result in a corresponding score. In the prediction process, the sales information for the candidate item can include a predicted one for said future period and/or a historical one, and the promotion information for the candidate item can include a predicted one for said future period and/or a historical one, as described above with respect to the training process. In the prediction procedure, it is possible not to adjust at least some of the model's parameters, for example, the item embedding layer and the property embedding layer, based on the resultant score.

Figure 5:
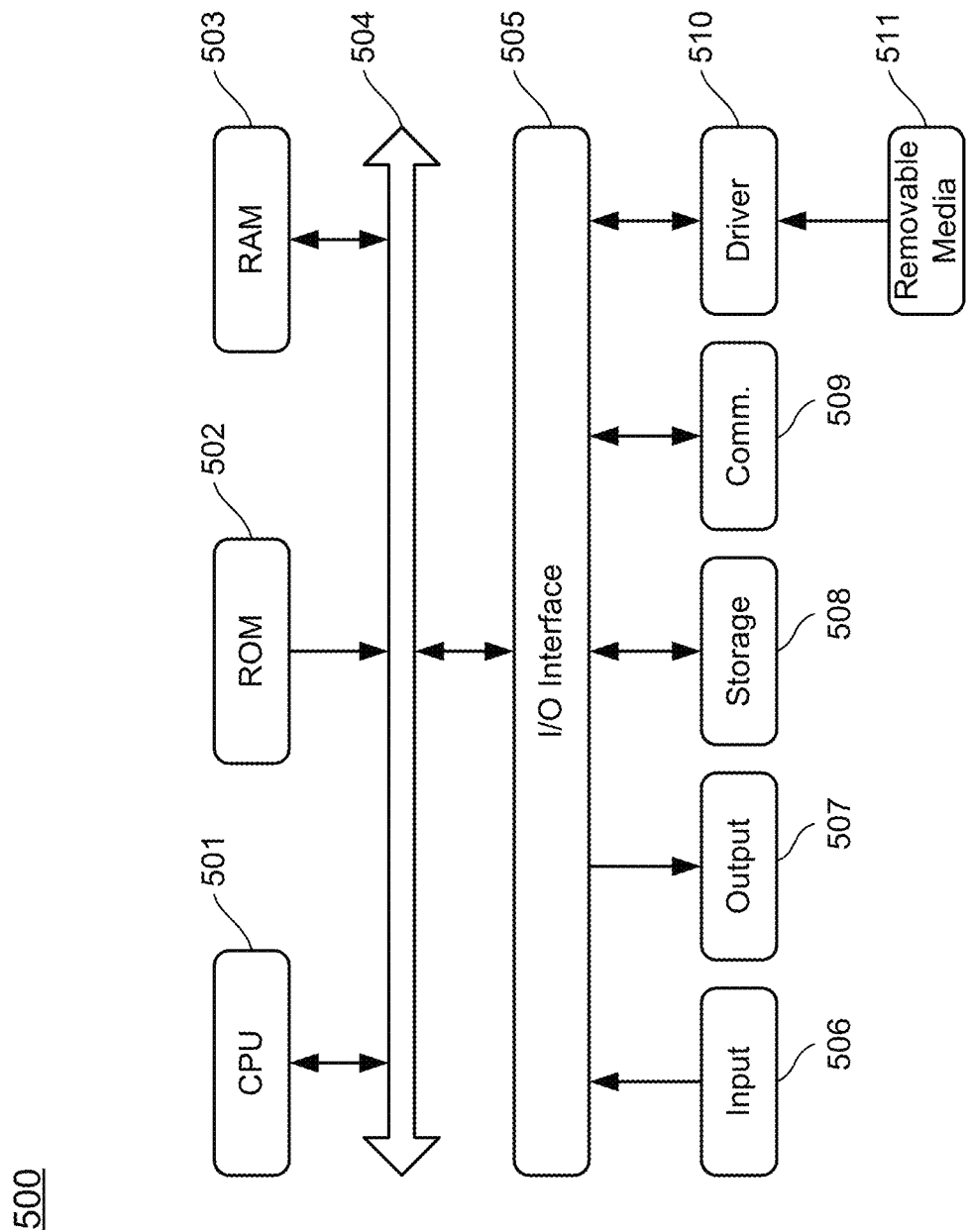
FIG. 5 schematically depicts a computing device according to certain embodiments of the present disclosure.

FIG. 5 schematically depicts a computing device according to certain embodiments of the present disclosure.

As shown in FIG. 5, the computing device 500 includes a Central Processing Unit (CPU) 501. The CPU 501 is configured to perform various actions and processes according to programs stored in a Read Only Memory (ROM) 502 or loaded into a Random Access Memory (RAM) 503 from storage 508. The RAM 503 has various programs and data necessary for operations of the computing device 500. The CPU 501, the ROM 502, and the RAM 503 are interconnected with each other via a bus 504. Further, an I/O interface 505 is connected to the bus 504.

In certain embodiments, the computing device 500 further includes at least one or more of an input device 506 such as keyboard or mouse, an output device 507 such as Liquid Crystal Display (LCD), Light Emitting Diode (LED), Organic Light Emitting Diode (OLED) or speaker, the storage 508 such as Hard Disk Drive (HDD), and a communication interface 509 such as LAN card or modem, connected to the I/O interface 505. The communication interface 509 performs communication through a network such as Internet. In certain embodiments, a driver 510 is also connected to the I/O interface 505. A removable media 511, such as HDD, optical disk or semiconductor memory, may be mounted on the driver 510, so that programs stored thereon can be installed into the storage 508.

In certain embodiments, the process flow described herein may be implemented in software. Such software may be downloaded from the network via the communication interface 509 or read from the removable media 511, and then installed in the computing device. The computing device 500 will execute the process flow when running the software.

In a further aspect, the present disclosure is related to a non-transitory computer readable medium storing computer executable code. The code, when executed at one or more processer of the system, may perform the method as described above. In certain embodiments, the non-transitory computer readable medium may include, but not limited to, any physical or virtual storage media.

Figure 6A:
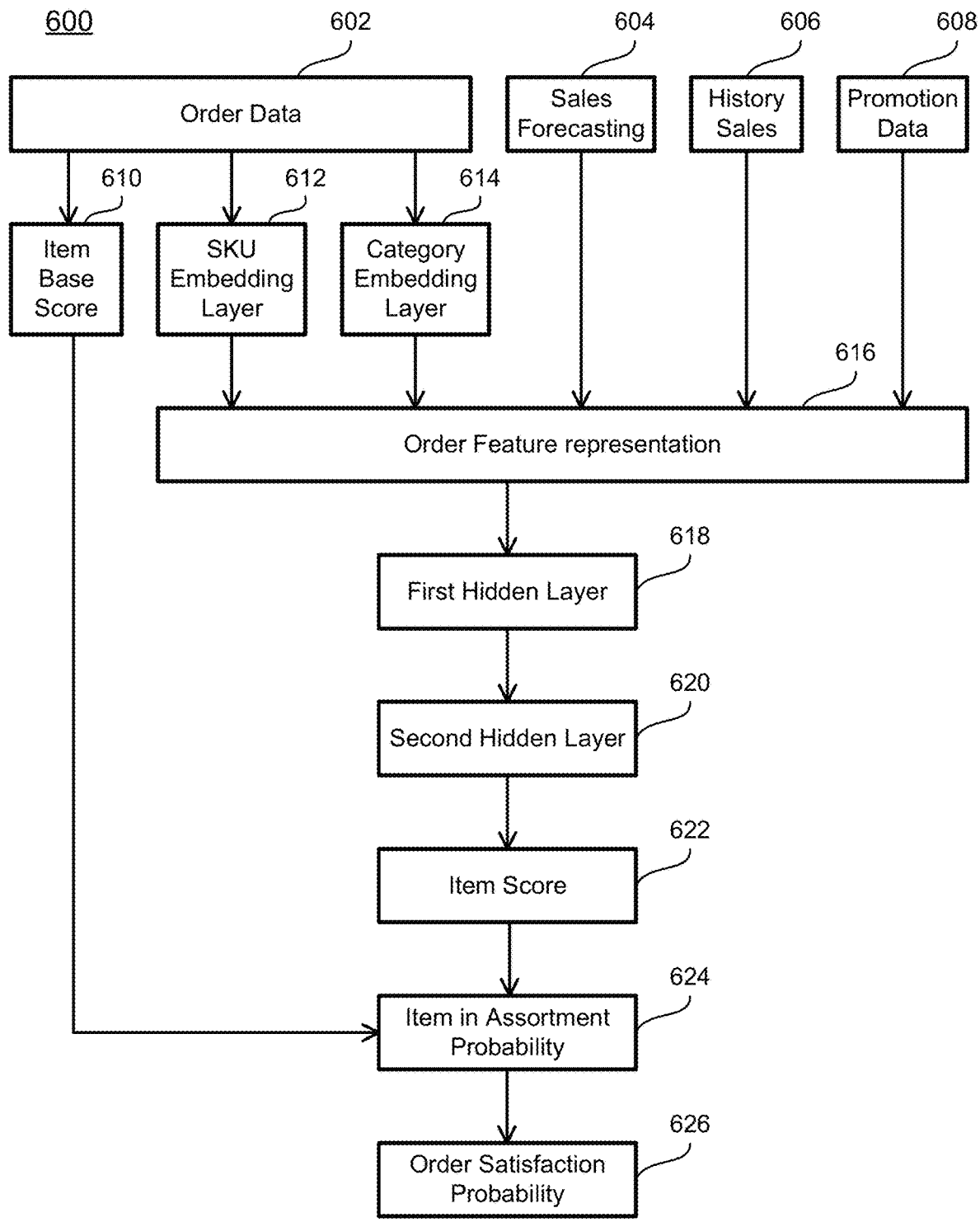
FIGS. 6A-6C schematically depict a split-order training process according to certain embodiments of the present disclosure.
Figures 6B, 6C:
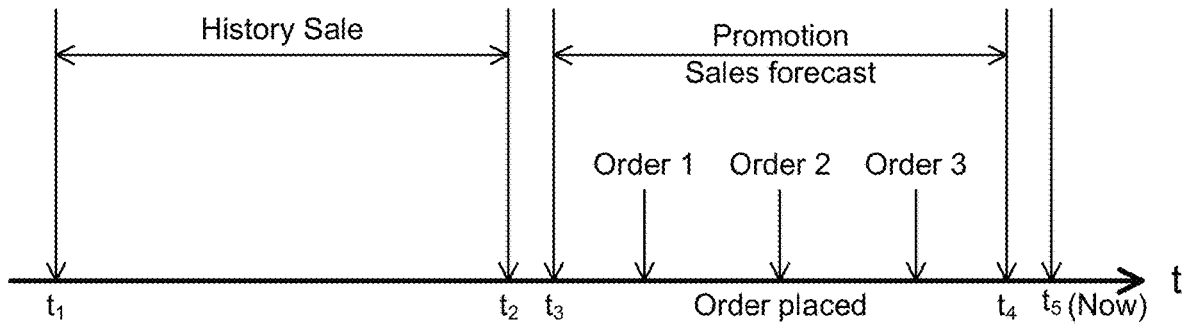

FIGS. 6A-6C schematically depict a split-order training process according to certain embodiments of the present disclosure. The training process may be performed by a Split-order Application installed on the server 109. As shown in FIG. 6A, the training process 600 uses order data 602, sales forecasting 604, history sales 606, and promotion data 608 as inputs. As shown in FIG. 6B, the training is performed at the current time $t_5$, but the cut off time for history and forecast is set at $t_2$ or $t_3$. Here $t_2$ and $t_3$ may be the same time or have a very short time interval, and $t_4$ and $t_5$ may be the same time or have a very short time interval, so as to separate and organize the history sales and sales forecast data conveniently. The order data 602 includes order 1, order 2, order 3 . . . which are real orders placed by customers between the time $t_3$ and $t_4$. The sales forecasting 604 is obtained at time $t_3$, which are future data viewing at the time $t_3$. The history sales 606 are real sales between the time $t_1$ and $t_2$. The promotion data 608 is obtained at time $t_3$, which are future promotions already planned viewing at the time $t_3$. In one example, the time $t_3$ to $t_4$ may be the past two weeks, the time $t_1$ to $t_2$ may be the past year till about two weeks ago. That is, time $t_4$ and $t_5$ is about the current time, the time $t_2$ and $t_3$ is about two weeks ago, and the time $t_1$ is about one year ago. The time span from $t_1$ to $t_2$ and from $t_3$ to $t_4$ may vary. For example, the time span $t_3$ to $t_4$ may be two weeks, four weeks, one month, six weeks, etc., the time span $t_1$ to $t_2$ may be about six months, one year, two years, five years, etc.

In one example, as shown in FIG. 6C, the Split-order Application retrieves an order from the order data 602. The order was placed by a customer during the past two weeks (time $t_3$ and $t_4$), and includes items of a MacbookPro, a keyboard, and a mouse. The Split-order Application then retrieves SKU information of each item from a SKU embedding vector database and places the retrieved SKU vectors into the SKU embedding layer 612, and retrieves the category information of each item from a category embedding vector database and places the retrieved category vectors into the category embedding layer 614. If the SKU vectors are not available in the SKU embedding vector database and/or the category vectors are not available in the category embedding vector database, the Split-order Application may instruct the SKU embedding layer 612 to initialize the SKU vector of the product and instruct the category embedding layer 614 to initialize the category vector of the product by entering arbitrary vectors or empty vectors, and after training, the trained vectors can be fed back to the SKU embedding vector database and the category embedding vector database as new vector values for the corresponding items. The Split-order Application also provides an item base score for each of the items. The Split-order Application may store a base score for each item in the module of the item base score 610. When the Split-order Application processes an order, the items in the order are identified, and the identifications are used to retrieve the corresponding base scores. The item base score may be initialized using predetermined numbers, empty numbers, or 0. For example, in the beginning, the Split-order Application may set up of a vector, the vector has a number of components that corresponds to the number of possible items; each component has an identification such as a sequential number corresponding to a specific item, and a corresponding base value; the base value may be 0 when being initialized. After each round of training, the Split-order Application uses the result to adjust the values of the base scores. As shown in FIG. 6C, the SKU vectors are [(0.25, 0.3, −0.2), (0.35, 0.1, 0.2), (0.21, −0.2, 0.25)], the tree components respectively corresponding to MacbookPro, keyboard and mouse; the category vectors are [(−2.0, 0.13, −0.2), (0.52, −0.15, 0.32), (0.52, −0.15, 0.32)], the components respectively corresponding to computer, accessories and accessories, the category that the MarbookPro, keyboard and mouse belong to. The Split-order Application further retrieves history sales of the items from the history sales 606, for example, 15 MacbookPros, 20 keyboards, 30 mouses during one month prior to the last two weeks ($t_1$ to $t_2$). The Split-order Application also retrieves promotion data viewing two weeks ago about the possible promotion in the past two weeks (planned promotion during $t_3$ to $t_4$, viewing at time $t_3$). The promotion data is 0, 1, 0, which indicates that there would be promotion for keyboard in the next two weeks, but no promotion for the MacbookPro and mouse in the next two weeks. The Split-order Application may further retrieve sales forecasting data, which may be determined based on the sale of the items in the past year, the sale of the items in the same month last year, etc. The sales forecasting data is not shown in this example, but it can be easily incorporated in the order feature representation by adding one or a few dimensions of the vector. After retrieving the above mentioned vectors, the Split-order Application combines the vectors to form the order feature representation 616 for the three items, each item is represented by SKU information, category information, history sales, and promotion data, each item includes eight dimensions of information. Further, the Split-order Application retrieves item base score for each of the items in the order. The base scores of the items, in the beginning, may be set as empty or set with arbitrary numbers, and will be updated by the feedback of the Split-order Application. After the order feature representation is prepared, the Split-order Application sends the representation to the first hidden layer 618 for machine learning. As shown in FIG. 6C, after the procession by the first hidden layer 616, the dimensions for each item is convoluted from eight to five. Subsequently, the Split-order Application sends the result from the first hidden layer 618 to the second hidden layer 620, and the second hidden layer 620 convolutes the five dimensions for each item into four. In certain embodiments, the number of the hidden layers may vary according to the efficiency of the convolution. Based on the four dimensions for each item, the Split-order Application calculates the item score 622 for each item, which in this example is respectively 10, 8 and 6. The Split-order Application then combines, for example by adding, the item base score 610 and the calculated item score 622 to obtain a final score, and determines the probability of each item in the assortment 624, here 0.9, 0.8 and 0.25 respectively, where the probability is between 0 and 1. The Split-order Application calculate the probability ($p_{item}$) from the final score ($\theta_{item}$) by:

$$p_{item} = \text{sigmoid}(\theta_{item}) = \frac{1}{1 + e^{-\theta_{item}}}$$

The Split-order Application then calculates the satisfaction probability of the order 626, that is, the probability that the order is not a split order, which is the product of the probability of each item in the assortment, that is, 0.9×0.8×0.2=0.144. 0.144 is the estimated probability by the Split-order Application that the order is not a split-order. Then the Split-order Application check whether the order was split or not in reality, and uses the checked result as feedback to adjust parameters of the second hidden layer 620, the first hidden layer 618, the category embedding layer 614, the SKU embedding layer 612, and the item base score 610. The second hidden layer 620, the first hidden layer 618, the category embedding layer 614, the SKU embedding layer 612, and the item base score 610 are learnable components. The process may be iterated for predetermined rounds or until the result is converged to a certain standard, which indicates the Split-order Application is well trained.

Figure 7A:
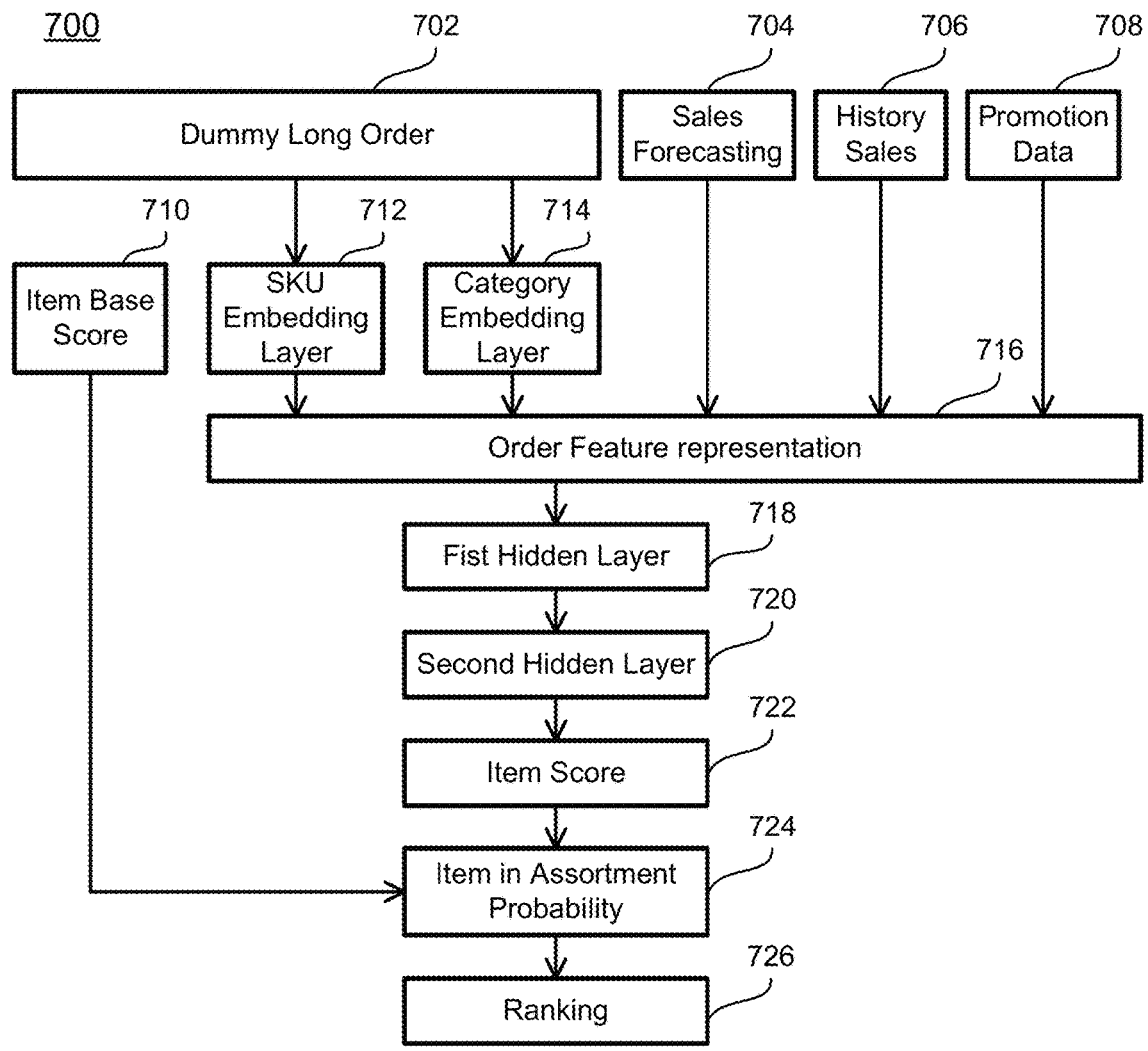
FIGS. 7A-7B schematically depict a split-order prediction process according to certain embodiments of the present disclosure.
Figure 7B:
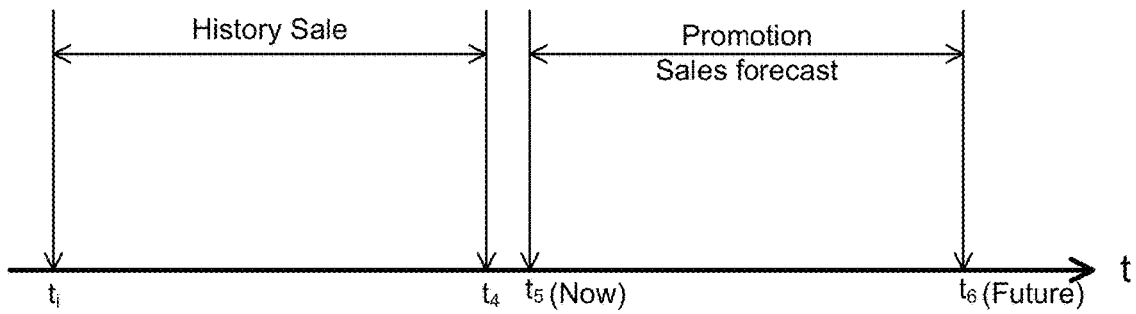

After training, the Split-order Application can be used for prediction. FIGS. 7A-7B schematically depict a split-order prediction process according to certain embodiments of the present disclosure. In the FIG. 7A, the parameters in the item base score 710, the SKU embedding layer 712, the category embedding layer 714, the first hidden layer 718 and the second hidden layer 720 are determined by the training shown in FIG. 6A and fixed. Those parameters in FIG. 6A would be updated during the training process by feedback, but there is no feedback in the prediction of FIG. 7A and those parameters would not change during the prediction. As shown in FIG. 7B, the prediction is performed at the current time $t_5$. The Split-order Application generate a dummy long order 702, which is an order with all the items available in an item database or management database, or in other words, the long order 702 have identification of all the products of for example an e-commerce provider that are available for an RDC. The sales forecasting 704 is obtained at time $t_5$, which are future data viewing at the time $t_5$ for two weeks in the future, or one month or other length of the time. The history sales 706 are real sales between the time $t_i$ and $t_4$, which could be two weeks, four weeks, or six weeks before the current time $t_5$ (or $t_4$, since $t_4$ may be the same as $t_5$, or substantially equals to $t_5$), or the same month the last year corresponding to the current month. The promotion data 708 is obtained at time $t_5$, which are planned future promotions during $t_5$ to $t_6$. The length of the time between $t_5$ and $t_6$ may be two weeks, four weeks, or a month from the current time.

In one example, as shown in FIG. 7, the Split-order Application uses the dummy long order 702 to retrieve the identification, the category, the sales forecasting, the history sales, and the promotion data for each of the items to generate order feature representation 716, which is multi-dimension vector. Then the Split-order Application send the representation 716 to the first hidden layer 718 and the second hidden layer 720 to convolute the number of dimensions for each item. Then the Split-order Application uses the simplified item representation to calculate item score 722. The calculated score 722, in combination with the item base score 710, are used to determines the probability of the item in the assortment. When the number of items in the dummy long order is 100,000, the result is a 100,000×1 vector, each component of the vector corresponding to the probability of the corresponding item's existence in the assortment. Then the Split-order Application may use the vector to make a ranking 726 of the items. The ranking 726 may be an incorporated step in the prediction or an independent operation. The fulfillment of the items in an RDC may be performed based on the ranking, to pick up the number of high ranking items that the RDC can store.

Figure 8:
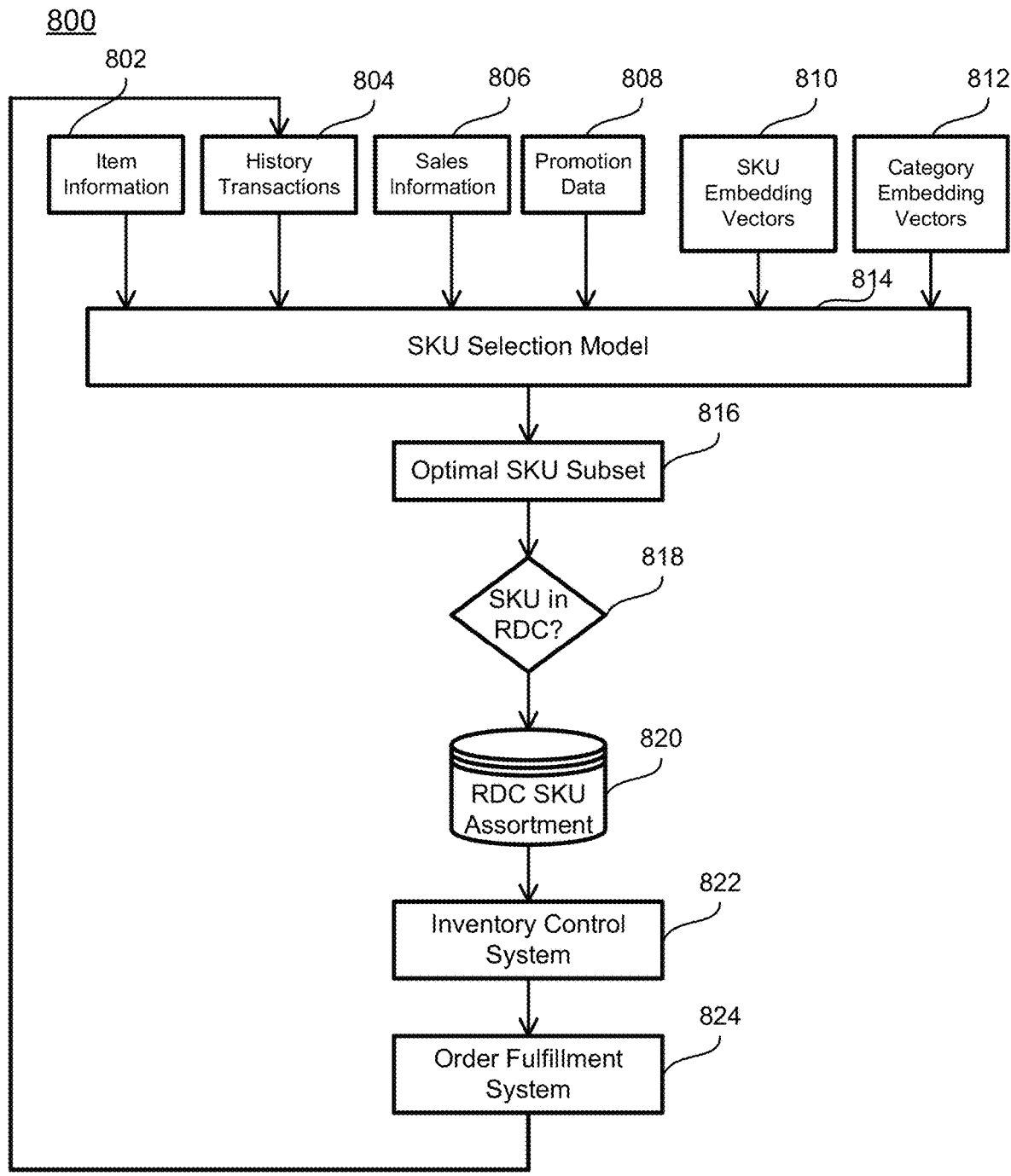
FIG. 8 schematically depict an assortment decision according to certain embodiments of the present disclosure.

FIG. 8 schematically depict an assortment decision according to certain embodiments of the present disclosure, which may be accomplished by the Split-order Application. The item information 802 may include the name, category etc. of each item; the history transactions 804 includes information of all the previous orders; the sales information includes previous sales data; and the promotion data 808 includes previous promotion data and the future promotion data that is available at current time. As shown in FIG. 8, the Split-order Application uses the item information 802, the history transactions 804, the sales information 806, the promotion data 808, the SKU embedding vectors 810, and the category embedding vectors 812 as inputs of the SKU selection model 814, which basically runs the training and prediction of FIGS. 6A-7B. Specifically, the Split-order Application selects certain dataset based on FIG. 6A to run the training process, and obtains parameters for the SKU embedding layer, the category embedding layer, the item base score, the first hidden layer and the second hidden layer. After the training, the Split-order Application fixes those parameters, and select a set of dataset based on FIG. 7A, and obtains probabilities for each item, and a ranking of the items. In other words, the SKU selection model corresponds to the learnable modules and the few related operational modules in FIG. 6A and FIG. 7A. Further, for a batch of training and prediction, the Split-order Application stores the fixed parameters of SKU embedding vectors and the category embedding vectors after training to database SKU embedding vectors 810 and the database category vector 812, such that when the user performs another batch of training and prediction, the training process can retrieve those parameters from the databases 810 and 812 rather than initialize those parameters. In contrast, the Split-order Application does not permanently store the item base score and the parameters of the first and second hidden layers, and when performing another batch of training, those parameters needs to be initialized again.

Based on the ranking of the items and the storage limitation of the RDC, an optimal SKU subset is determined at 816. Then at 818, the Split-order Application compares the SKU subset 816 with the RDC SKU assortment 820. In other words, the Split-order Application compare the predicted optimal subset of the items with the items stored in the RDC. When an item in the optimal SKU subset 816 is also available in the RDC, the Split-order Application may simply make a record and doesn't need to do anything further. When an item in the optimal SKU subset 816 is not available in the RDC, the Split-order Application instructs the inventory control system 822 to add the item into the RDC SKU assortment. For the items exist in the RDC but no required by the optimal SKU subset, the Split-order Application may instruct the RDC to stop replenishment of the item, and the item may run out later. The order fulfillment system fulfils its order through the RDC, and the order fulfillment information can be recorded and used to update the history transactions 804.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for selecting items to be stored in a warehouse from a list of candidate items, the system comprising a computing device, the computing device comprising a processor and a storage device storing computer executable code, wherein the computer executable code, when executed at the processor, is configured to:
assign scores to the respective candidate items based on an item selection model; and select items from the candidate items to be stored in the warehouse according to the assigned scores under a capacity limit of the warehouse, wherein the item selection model is configured with an Artificial Neural Network (ANN), having item data for an item as input and a score for that item as output, the score representing a probability that the item is to be stored in the warehouse, and wherein the ANN is trained by historical orders, each of which includes one or more items, under a constraint of the capacity limit of the warehouse with an objective of maximizing a probability that the orders have their respective item(s) all stored in the same warehouse.

2. The system of claim 1, wherein the ANN is configured with two or more hidden layers.

3. The system of claim 1, wherein the computer executable code, when executed at the processor, is further configured to represent the item data for the item as a vector corresponding to the item.

4. The system of claim 3, wherein the vector for the item comprises element(s) associated with a unique identifier (ID) of the item and element(s) associated with a property of the item.

5. The system of claim 4, wherein the vector for the item further comprises an element associated with sales data of the item and/or an element associated with promotion data of the item.

6. The system of claim 4, wherein the property comprises at least one of category or brand of the item.

7. The system of claim 4, wherein the computer executable code, when executed at the processor, is further configured to update mapping from the ID to its corresponding element(s) and mapping from the property to its corresponding element(s) based on the training.

8. The system of claim 4, wherein the element(s) associated with the ID or the element(s) associated with the property is/are randomized at initialization of the ANN.

9. The system of claim 1, wherein a probability that an item is to be stored in the warehouse is a sigmoid function of the score assigned to that item, that is, the probability $p_{item}$ and the score $\theta_{item}$ satisfy:

$$p_{item} = \text{sigmoid}(\theta_{item}) = \frac{1}{1 + e^{-\theta_{item}}}.$$

10. The system of claim 1, wherein a probability that an order has its items all stored in the same warehouse is a production of probabilities that the respective items included in this order are to be stored in the warehouse, and the ANN is configured to maximize a sum of the probabilities of the respective orders.

11. A method of selecting items to be stored in a warehouse from a list of candidate items, the method comprising:

establishing an item selection model with an Artificial Neural Network (ANN), having item data for an item as input and a score for that item as output, the score representing a probability that the item is to be stored in the warehouse;

training the item selection model with historical orders, each of which includes one or more items, under a constraint of a capacity limit of the warehouse with an objective of maximizing a probability that the orders have their respective item(s) all stored in the same warehouse;

assigning scores to the respective candidate items based on the trained item selection model; and selecting items from the candidate items to be stored in the warehouse according to the assigned scores under the capacity limit of the warehouse.

12. The method of claim 11, wherein the ANN has two or more hidden layers.

13. The method of claim 11, further comprising representing the item data for the item as a vector corresponding to the item.

14. The method of claim 13, wherein the vector for the item comprises element(s) associated with a unique identifier (ID) of the item and element(s) associated with a property of the item.

15. The method of claim 14, wherein the vector for the item further comprises an element associated with sales data of the item and/or an element associated with promotion data of the item.

16. The method of claim 14, wherein the property comprises at least one of category or brand of the item.

17. The method of claim 14, further comprising updating mapping from the ID to its corresponding element(s) and mapping from the property to its corresponding element(s) based on the training.

18. The method of claim 14, wherein further comprising randomizing the element(s) associated with the ID or the element(s) associated with the property at initialization of the ANN.

19. The method of claim 11, wherein a probability that an order has its items all stored in the same warehouse is a production of probabilities that the respective items included in this order are to be stored in the warehouse, and the training is performed by maximizing a sum of the probabilities of the respective orders.

20. A non-transitory computer readable medium storing computer executable code, wherein the computer executable code, when executed at a processor, is configured to:

establish an item selection model with an Artificial Neural Network (ANN), having item data for an item as input and a score for that item as output, the score representing a probability that the item is to be stored in the warehouse;

train the item selection model with historical orders, each of which includes one or more items, under a constraint of a capacity limit of the warehouse with an objective of maximizing a probability that the orders have their respective item(s) all stored in the same warehouse;

assign scores to the respective candidate items based on the trained item selection model; and select items from the candidate items to be stored in the warehouse according to the assigned scores under the capacity limit of the warehouse.

* * * * *